United States Patent [19]

Comroe et al.

[11] Patent Number: 4,926,495
[45] Date of Patent: May 15, 1990

[54] COMPUTER AIDED DISPATCH SYSTEM

[75] Inventors: Richard A. Comroe, East Dundee; Richare H. Coe, Arlington Heights; Katherine B. Roane, Glenview; Lewis H. Rosenthal, Buffalo Grove, all of Ill.

[73] Assignee: Motorola, Inc., Schaumburg, Ill.

[21] Appl. No.: 940,321

[22] Filed: Dec. 11, 1986

[51] Int. Cl.$^5$ .............................................. H04B 7/26
[52] U.S. Cl. ........................................ 455/54; 455/53; 370/85.1; 340/825.06
[58] Field of Search ................... 455/54, 53, 56, 33, 455/11, 38; 340/825.05, 825.06; 370/85, 94, 95, 88, 60; 379/59, 63; 364/131, 132, 133, 134, 138, 147, 141

[56] References Cited

U.S. PATENT DOCUMENTS

| | | | |
|---|---|---|---|
| 4,466,125 | 8/1984 | Kanayama | 455/56 |
| 4,602,364 | 7/1986 | Herman et al. | 370/85 |
| 4,610,206 | 9/1986 | Kubala et al. | 364/131 X |
| 4,614,978 | 9/1986 | Doster et al. | 358/263 |
| 4,707,827 | 11/1987 | Bione et al. | 370/88 X |
| 4,740,882 | 4/1988 | Miller | 340/825.06 X |
| 4,742,514 | 5/1988 | Goode et al. | 455/54 X |
| 4,775,999 | 10/1988 | Williams | 455/33 X |

FOREIGN PATENT DOCUMENTS

0154829 9/1984 Japan .......................... 455/54

Primary Examiner—Benedict V. Safourek
Assistant Examiner—Ralph E. Smith
Attorney, Agent, or Firm—Wayne J. Egan; Thomas G. Berry

[57] ABSTRACT

A computer aided dispatch system is provided for use in a trunked communication system. The system comprises at least a master file node and a plurality of user nodes. The master file node contains a data record for each subscriber on the trunked communication system. Each data record has a plurality of fields that may assume various values. Each dispatcher "attaches" to a particular value of at least one field in any of the data records. The master file node maintains the records for each subscriber and automatically transmits an updated record to each dispatcher attached to the subgroup in which the subscriber operates. In this way, dispatchers are continuously provided the latest subscriber status even though the responsibility for monitoring the status of a particular subscriber unit may dynamically pass from dispatcher to dispatcher.

8 Claims, 6 Drawing Sheets

COMPUTER AIDED DISPATCH SYSTEM

TECHNICAL FIELD

This invention relates generally to computer aided dispatch systems and more particularly to a computer aided dispatch system for use in a trunked communications system.

BACKGROUND ART

Historically, computer systems comprised "main frame" systems. That is, a "main frame" computer, various interfaces, and user terminals. The term "main frame" means that the computer for the entire system is located or housed in a single box or frame, rather that distributed throughout the system. Accordingly, in the traditional approach, a single computer held responsibility for computational tasks, interface control, driving the monitor on the user terminals, reading the keystrokes of each user keyboard, and maintaining a master data base containing all data files, records, and programs.

In actual use, these system were cost effective only for large operations The main frame computer, being the heart of the system, commanded the major portion of the purchase price, which required small users to buy a more powerful system than was needed. Alternately, the purchase of a "small system" generally resulted in expansion problems when the small user grew to an intermediate size, and was force to purchase yet another computer system. For these reasons, distributed or modular computer systems became the preferred approach in many traditional main frame applications.

In a distributed computer system, the computational power (or intelligence) is distributed throughout the system. To fully exploit the benefits of a distributed system, the fundamental operation of the system must be changed. In addition to distributing the hardware (i.e., computing nodes in place of "dumb" terminals), the data base or software must also be distributed. Thus, each computing node assumes responsibility for maintaining a self-satisfying portion of the entire data base. That is, all data files or records and the operating program required to manipulate and display the data under normal operating conditions reside within the computer node. Normally, the distributed computing nodes are interconnected via some communication network to allow communication of data files or programs between computing nodes. If a computing node requires information supplemental to that of its data base, a request for the required information may be transmitted to the appropriate node via the interconnecting network. In this way, full access to all information is provided in a distributed and readily expandable computer system.

In a basic trunked communication system there exists a high degree of flexibility to partition conversations between different groups so that no one agency or district is aware that another agency or district is using the system. These groups can be subdivided into subgroups, so that only those individuals who need to communicate together on a normal basis are aware when a conversation is in progress. Further, an individual may initiate a private conversation between only two parties without disturbing either the remaining subscribers in the group or subgroup within which that individual normally operates.

A typical example of such a hierarchy may be a group ID assigned to a construction company, and subgroups assigned to management personnel, delivery personnel, and various on-site teams. Of course, each subscribing unit has its own individual ID for individual calls. Thus, all of management personnel may communicate on a subgroup basis without disturbing the other personnel in the construction company. Also, a group-wide call may be made to all individuals associated with the construction company. The same hierarchical analogy can be drawn to the public safety market. For example, the groups could be fire and police departments and the subgroups consisting of individual districts.

The individuals communicating via a trunked communication system are normally referred to as subscriber units. Generally, a subscriber may be a portable unit, mobile unit, or a control station. Typically, a portable unit is designed to be carried on or about the person. A mobile unit is normally designed to be used in vehicles. A control station is usually understood to be a permanent or semi-permanent installation in a building or other fixed location. As used herein, all these communicating units or stations are collectively referred to as subscriber units.

Generally, it is known to use a subscriber's identification (ID) code to effectuate the desired type of communication. Accordingly, each subscriber contains a code plug or a programmable read only memory (PROM) that specifies the group, subgroup, and individual ID's that enable the subscriber to participate in either an individual, subgroup, or group-wide call. If a subscriber unit is programmed to allow communications in more than one subgroup, a selection mechanism, for example, a selection switch, is used by the subscriber to select the particular subgroup in which it desires to operate.

To initiate a call, a subscriber unit transmits a "channel request" inbound signalling word (ISW) to the central controller of the trunked communication system. The central decodes this request and, if a communication channel is available, returns a "channel grant" outbound signalling word (OSW) consisting of the requesting unit's ID code and the identification of the assigned channel. The channel grant causes the requesting subscriber to move to the assigned channel and begin transmitting, while causing the remaining units in the group, subgroup, or an individual (depending upon whether a group, subgroup, or individual call was requested) to move to the assigned channel as listening units. In this way, trunked communication is established.

In particular implementations of trunked communications systems, it is desirable to have one or more dispatchers monitor all calls occurring on the trunked communication system. For example, public safety communications systems are often required by regulatory agencies to provide at least one dispatcher to monitor and control the communication system at all times. Accordingly, some communication systems include a dispatcher console that may initiate or monitor the trunked system. Generally, the dispatcher is given additional powers such as the ability to take over a communication channel during an emergency situation.

In addition to voice messages, predetermined status messages are often used in trunked communication systems to rapidly convey status information of an ordinary nature. For example, "available" or "at scene" may be typical status messages employed by a police or fire department. To transmit these messages, it is known to have a small status panel having numerous activators to automatically send these messages in addition to the identification code of the subscriber reporting status. The dispatcher terminal may illuminate certain indicators to indicate the status of an individual subscriber unit.

However, in a system having a large number of subscribers it often becomes impractical to have the individual status indicators for each subscriber. Moreover, as a subscriber changes groups or subgroups it may be impossible to reconfigure the status indicators to properly inform the dispatcher of the subscribers activities or status. Accordingly, a need exists for an effective status reporting and dispatch system to enable efficient and effective control of the trunked communication system.

SUMMARY OF THE INVENTION

Accordingly, it is an object of the invention to provide an improved trunked communication system.

It is another object of the present invention to provide a trunked communication system having a computer aided dispatch system.

It is another object of the present invention to provide a computer aided dispatch system that dynamically distributes status information among available dispatchers.

It is a further object of the present invention to provide a unique "attachment" file handling mechanism which readily affords dynamic file allocation.

Accordingly, these and other objects are achieved in the present computer aided dispatch system.

Briefly, according to the invention, a computer aided dispatch system comprises a master file node and a plurality of user nodes. The master file node contains a data record for each subscriber on the trunked communication system. Each data record has a plurality of fields that may assume various values. Each dispatcher "attaches" to any data record containing particular values of at least one field in any of the data records. The master file node maintains the records for each subscriber and automatically transmits an updated record to each dispatcher attached to the subgroup in which the subscriber operates. In this way, dispatchers are continuously provided the latest subscriber status even though the responsibility for monitoring the status of a particular subscriber unit may dynamically pass from dispatcher to dispatcher.

BRIEF DESCRIPTION OF THE DRAWINGS

The features of the present invention which are believed to be novel are set forth with particularity in the appended claims. The invention, together with further objects and advantages thereof, may be understood by reference to the following description, taken in conjunction with the accompanying drawings, and the several figures of which like reference numerals identify like elements, and in which:

DETAILED DESCRIPTION OF THE PREFERRED EMBODIMENT

Figure 1:
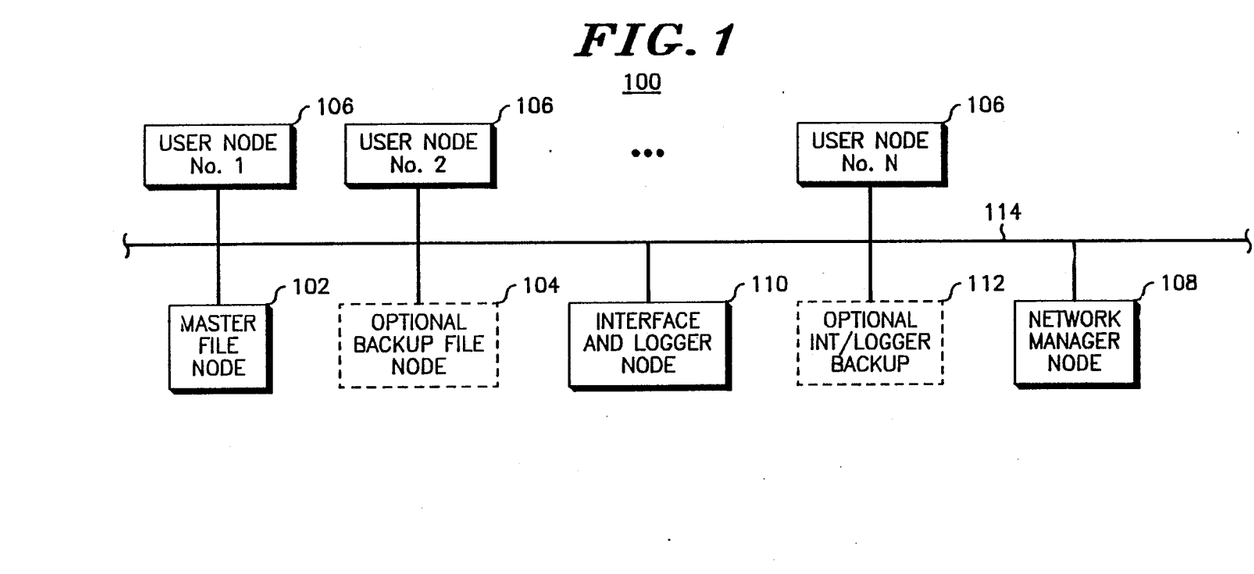
FIG. 1 is a block diagram of the computer aided dispatch system of the present invention.

Referring now to FIG. 1, there is shown a block diagram of the computer aided dispatch system 100 of the present invention. The system is comprised of a master file node 102, an optional back-up file node 104, a plurality of user nodes 106, a network manager node 108, and an interface and data logger node 110, which may optionally be backed-up (112). Each of these nodes is interconnected via a local area network (LAN) system 114, which may be any suitable networking system such as the Ethernet system as is known in the art.

The master file node 102 maintains a centralized data base for the dispatch system 100. The data base contains application programs that are "down loaded" to the other nodes for execution. Additionally, the master file node 102 maintains a data record (or file) for each subscriber unit operating on the trunked system (not shown). Each record contains several fields indicating information about the subscriber, and may include such information as the subscribers home group and subgroup identification, the last used group and subgroup (for those subscribers having selection capabilities), the subscriber's current status, and other such information pertinent to a particular implementation. The master file node 102 also maintains an "attachment" file, which is a cross referencing table that links particular user nodes with particular values of data fields within data records, and thus, subscribers. As will become more apparent hereinafter, the "attachment" concept of file management is the heart of the dispatch system 100 of the present invention. The optional back-up file node 104 maintains a duplicate data base in the event of the failure of the master file node 102. Preferably, both the master file node 102 and the back-up file node 104 are IBM AT personal computers, or any of the many functional equivalents. Periodically, the back-up file node 104 interrogates the entire data base of the master file node 102 to confirm that the data bases are identical. Upon confirmation of the identity of the data bases, the optional file node 104 becomes the active file node, and the file node 102 assumes the role of the back-up file node. This alternation of the file node 102 and 104 affords the present invention protection from the late discovery that the back up file node 104 has failed.

The network manager node is a personal computer of the type manufactured by IBM and others that determines the initial attachment of data records to the user nodes 106. The network manager accomplishes this by assigning a "home" group and subgroup to each subscriber, and enters this information in an appropriate data field in each data record. The network manager may then assign particular groups and subgroups to dispatchers, who are automatically provided with updated records of any subscriber operating within a particular group or subgroup. Thus, the "attached" dispatchers assume responsibility for monitoring the status and activity of the assigned subgroups. A subgroup may be assigned to more than one user node and these assignments may be dynamically altered to accommodate varying numbers of dispatchers during peak and off peak system hours.

The interface and logger node 110 (and 112), interface the dispatch system 100 to the trunked communication system (not shown). The interface and logger nodes are responsible for the appropriate routing of ISWs and OSWs to and from the user nodes and the central controller of the trunked communication system. Optionally, the interface and logger node may print a data-log of all communication activity that has transpired over a fixed period. The optional back-up interface 112 is provided in the event of a failure of the primary interface node 110 so that a single point failure will not disable the dispatch system 100 of the present invention.

Each dispatcher operates a user node. Preferably, a user node is an IBM personal computer or its functional equivalent. The screen of the computer is organized to allow the dispatcher to readily investigate the status of any subgroup assigned by the network manager. Additionally, each user has the power to request the addition or deletion of attachment to particular groups or subgroups. As the status of a particular subscriber changes, the master data file 102 automatically provides an update to the attached user or users. In this way, the status of any particular subscriber may be continually monitored by at least one user, and the overall distribution of subscriber responsibility is dynamically alterable to accommodate the current number of dispatchers.

Figures 2, 3:
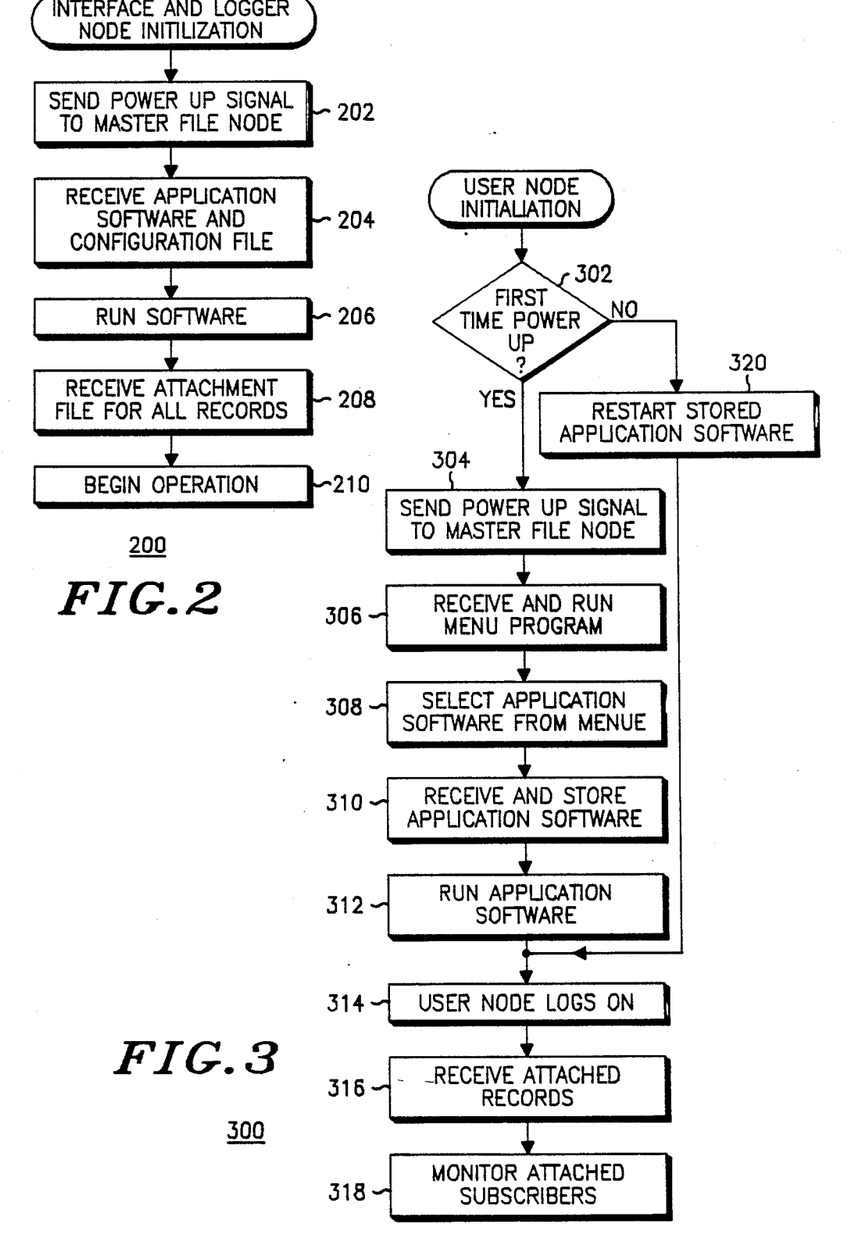
FIG. 2 is a flow diagram of the steps executed to initialize the interface and logger node of FIG. 1.
FIG. 3 is a flow diagram of the steps executed to initialize the user nodes of FIG. 1.

To initialize the system for operation, each user node 106 and the interface logger node 110 executes an initialization sequence prior to becoming operational. Referring now to FIG. 2, the initialization sequence for the interface and logger node 110 is illustrated. First, step 202 sends a power-up signal to the master file node 102. Upon receiving this signal, the master file node transmits, and the interface logger node receives, application software and a configuration file in step 204. The application software is merely the program that the interface and logger node 110 will execute during its normal operation. The configuration file contains parameters that define how communication information will be logged (assuming this option is installed). Typical information contained in the configuration file may define the type of printer employed, or whether the information should be stored on a hard or floppy disk. After receiving the application software, execution begins in step 206. In step 208, the interface logger node 110 receives the attachment file from the master file node 102. Thus, the interface and logger node 110 contains the complete attachment file, which cross references each user node to assigned subgroups via the subgroup value stored in at least one data field of each data record. After receiving this file, the interface logger node 110 begins operation in step 210 and will continue to operate until shut down or a failure occurs.

Referring now to FIG. 3, the initialization sequence 300 for each user node 106 is illustrated. Decision 302 determines whether this is the first powerup for a user node. If decision 302 is answered affirmatively, the routine proceeds to step 304 which sends a power-up signal to the master file node 102. In step 306, the user node receives and executes a menu selection program that enables the dispatcher to select an application program (step 308). The user node receives this application program in step 310 and locally stores it in any convenient storage means such as a hard or floppy disk. Following the reception and storage of the application program, the application program is executed in step 312, after which the user "logs on" in step 314. After an appropriate log on sequence has been verified, the user node receives (step 316) all attached data records that contain the subgroup(s) assigned by the network manager 110. Following this, the dispatcher monitors the subscribers operating in the attached subgroups via the updated data records automatically forwarded by the master file node 102. Assuming, however, that decision 302 determines that the user had previously powered-up, decision 302 transfers control to step 320, which restarts the application program stored during the initial power-up in step 310. Following this, steps 314-318 are executed and the dispatcher monitors the subscriber units via the attached records.

Figure 4:
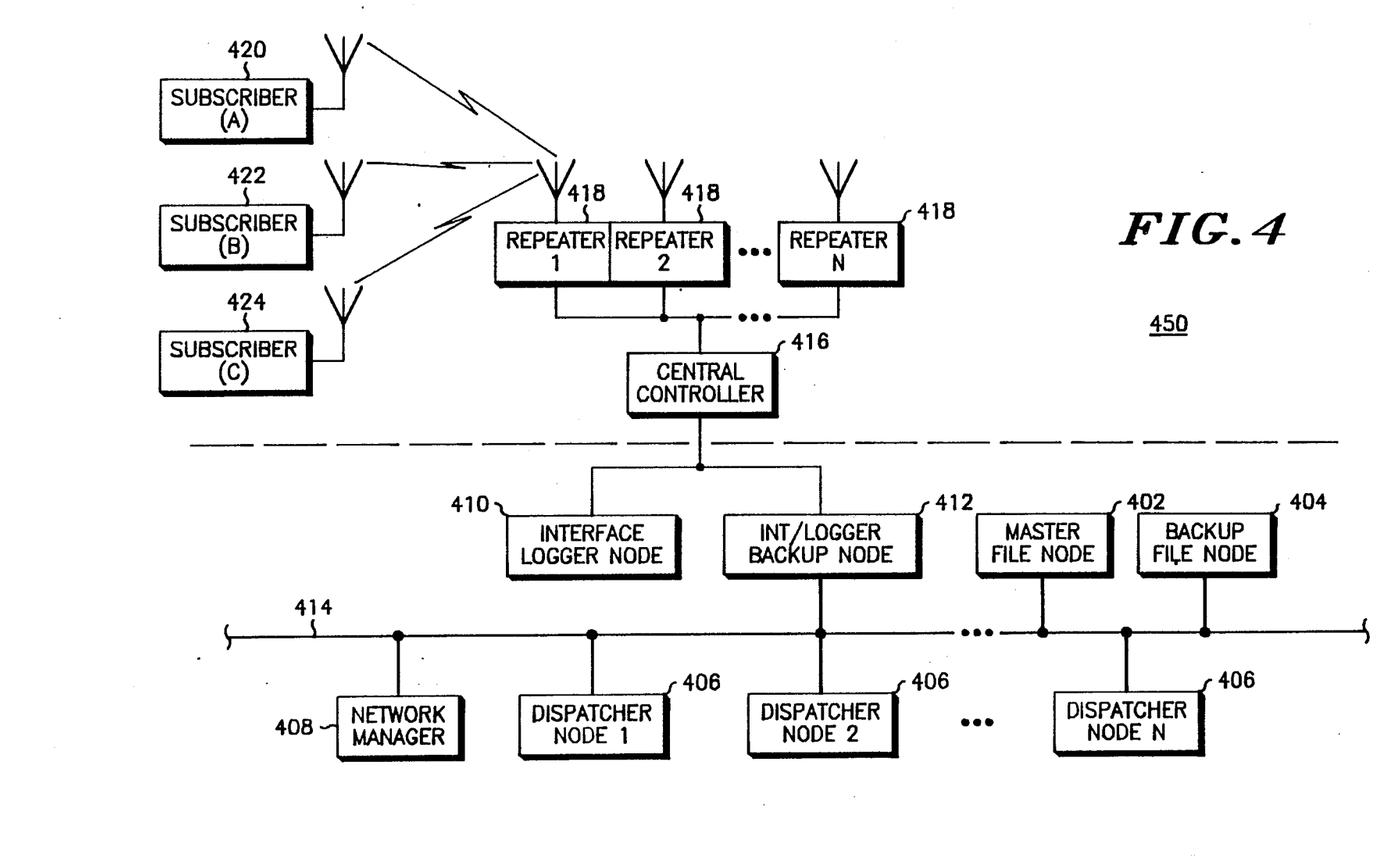
FIG. 4 is block diagram of the computer aided dispatch system of the present invention employed in a trunked communication system.

Referring now to FIG. 4, the computer aided dispatch system 400 of the present invention is shown operably connected to a trunked communication system 450. As described in conjunction with FIG. 1, the computer aided dispatch system comprises a master file node 402, a back up file node 404, a plurality of dispatcher (user) nodes 406, a network manager node 408, an interface and logger node 410 and a back-up interface and logger node 412. Each of these nodes are interconnected by a local area network (LAN) system 414 such as the Ethernet system. The interface and logger node 410 (and the back up node 412) are coupled to the central controller 416. The central controller 416 controls a plurality of trunked repeaters 418 and allocates these channels among a plurality of subscriber units. For illustration purposes, consider a simple trunked system having one group and three subgroups (A, B, and C). Accordingly, in a group wide call all subscribers may participate in the communication. For a subgroup call, only those subscribers residing in subgroup A (420), subgroup B (422, or subgroup C (424) may participate. Although illustrated as a single subscriber, it will be understood by those skilled in the art that there may be dozens or hundreds of subscribers in each of the subgroups A, B, and C.

For simplicity of illustration, assume the dispatch system 400 has two dispatchers (1 and 2). The network manager 408 may divide the available subgroups such that dispatcher 1 monitors subgroups A and B, and dispatcher 2 monitors subgroups B and C. Note that more than 1 dispatcher may have responsibility for monitoring a subgroup. This is particularly useful for those large subgroups that may be inappropriate for one dispatcher to handle, or in an emergency situation which demands the attention of several dispatchers.

Figure 5:
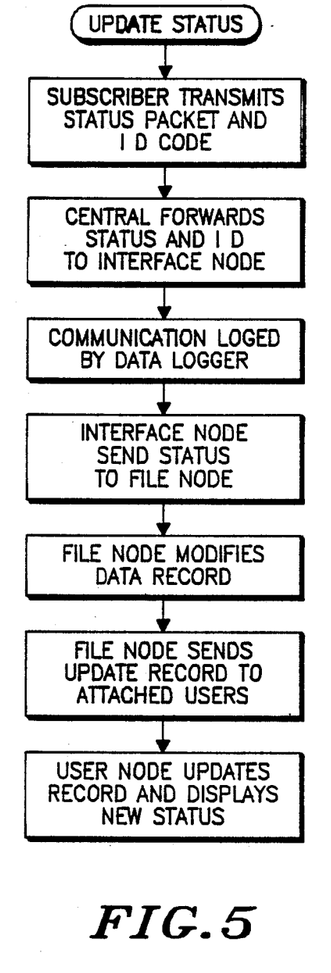
FIG. 5 is a flow diagram of the steps executed to update the status of a subscriber unit of FIG. 4.

To illustrate communication to and from the computer aided dispatch system 400, consider as a first example that a subscriber has changed status. Normally, status changes are effectuated by the subscriber momentarily depressing a button or activator, which causes a predetermined message to be transmitted together with his identification code. This data packet is received by the central controller 416, which routes it to the interface and logger node 410. The communication may be logged by the data logger in accordance with the instructions provided in the configuration file. The interface node 410 places the data packet on the LAN 414 and transmits it to the master file node 402. Upon receiving the data packet, the master file node 402 changes the appropriate data field within the record associated with the particular subscriber identified by the identification code. The master file node 402 then peruses the attachment file to identify the user(s) attached to the subgroup within which the subscriber resides. The master file node routes the updated records to the attached users, and the status changes are displayed to the dispatchers. For example, if a subscriber in subgroup A changed status, dispatcher 1 would have his records updated by the master file node. However, if a subscriber in subgroup B changed status, both dispatchers 1 and 2 would receive the updated records since both are attached to subgroup B. A flow diagram illustrating these steps is provided in FIG. 5.

Figure 6:
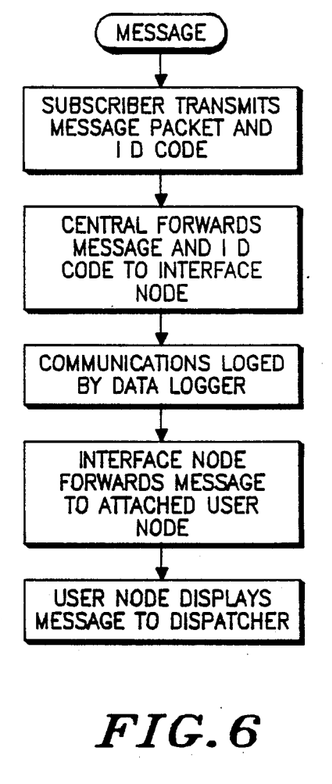
FIG. 6 is a flow diagram of the step executed to communicate a message from a subscriber to an attached dispatcher of FIG. 4.

The present invention also contemplates the transmission of predetermined messages from the subscribers to the dispatchers. Typically, messages do not necessarily modify a field within a data record of the master file node. Accordingly, in these cases, the master file node need not be informed since data records are not modified. For this type of communication, a subscriber transmits a message packet together with his ID code to the central controller 416. The central forwards this message and the identification code to the interface and logger node 410 and, if so equipped, the data logger logs the communication on an appropriate data medium. The interface node peruses the attachment file and routes the message to the user(s) attached to the subgroup in which the subscriber resides. Upon receipt, the user node displays the message to the dispatcher. A flow diagram illustrating these steps is provided in FIG. 6.

Figure 7:
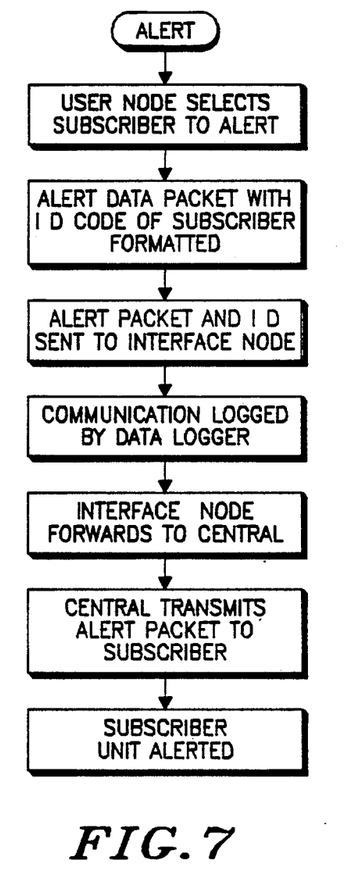
FIG. 7 is a flow diagram of the step executed to communicate an alert from an attached dispatcher to a selected subscriber of FIG. 4.

Communication may also travel from the dispatcher to the subscribers. As an example, consider a "call alert", which informs a subscriber that a dispatcher has attempted to contact him. The call alert feature is typically employed when the subscriber is temporarily out of service and cannot immediately respond to the call. To transmit the call alert, the dispatcher selects the subscriber(s) that he wishes to alert. An alert data packet together with the ID code of the selected subscriber are formatted in the computer terminal of the user node and forwarded to the interface and logger node 410. If the interface node is so equipped, the communication is logged in an appropriate data medium in accordance with the configuration file. The interface and logger node forwards the call alert data packet to the central controller 416, which transmits it via a repeater 418 to the particular subscriber unit. Normally, a subscriber unit responds by illuminating an indicator or sounding an audible signal, or both. A flow diagram illustrating these steps is provided in FIG. 7.

Figure 8:
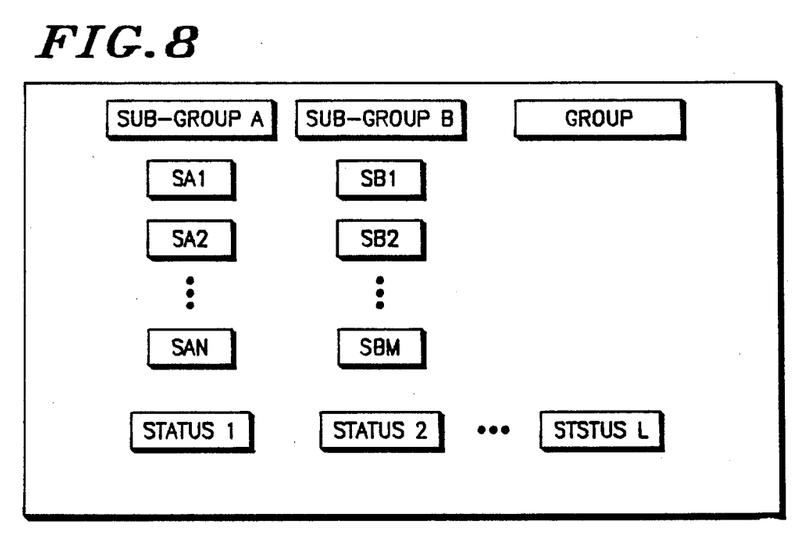
FIG. 8 is an exemplary illustration of the display format of a dispatcher computer terminal of FIG. 4.
Figure 9:
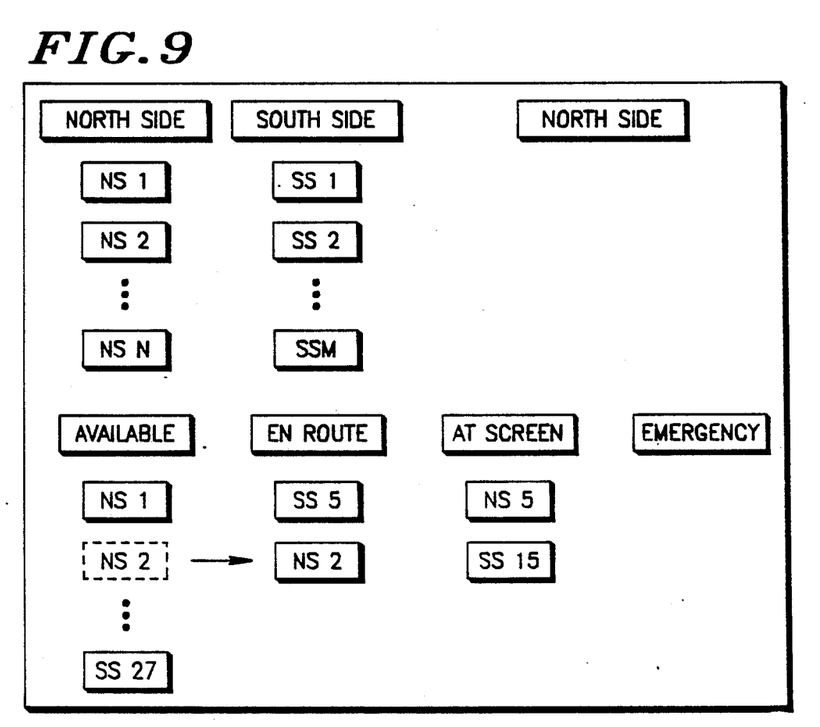
FIG. 9 is another exemplary illustration of the display format of a dispatcher computer terminal of FIG. 4.

Referring now to FIG. 8, there is shown an exemplary format of a typical user display. The top portions identify the groups and subgroups to which the user node is attached. The bottom portion provides various status conditions, below which acronyms identifying subscriber units may be listed. In FIG. 9, a more particular example is provided for a police department having subgroups partitioned into a Northside District and a Southside District. In the Northside subgroup, this example has N subscribers labelled NS1-NSN. Similarly, the Southside group has a plurality of subscribers identified as SS1-SSM. Also illustrated in FIG. 9 are four possible status conditions: "AVAILABLE", "EN ROUTE", "AT SCENE", and "EMERGENCY". As an example, and not as a limitation, various subscribers are listed in various status conditions. Assuming now that a request for police assistance has been received, a dispatcher may instruct one of the subscribers under the AVAILABLE status to respond. Assuming that subscriber NS2 has been so instructed, subscriber NS2 may change status by activating the EN ROUTE status condition to indicate that he is responding to the call. This status change would be processed as illustrated in FIG. 4 and an updated record would be received by the user node(s) attached to the Northside District. The updated status causes the acronym identifying subscriber NS2 to move from the AVAILABLE status to the EN ROUTE status as illustrated by the arrow in FIG. 9. In a similar manner, when subscriber NS2 arrived at the scene he may activate the AT SCENE status indicator, which would cause the identifier to move from the EN ROUTE status to the bottom of the AT SCENE status category. In this way, the dispatcher is presented with a dynamically varying picture of all subscribers residing in subgroups under his responsibility. This provides an instant indication of the status of any particular subscriber.

Figure 10:
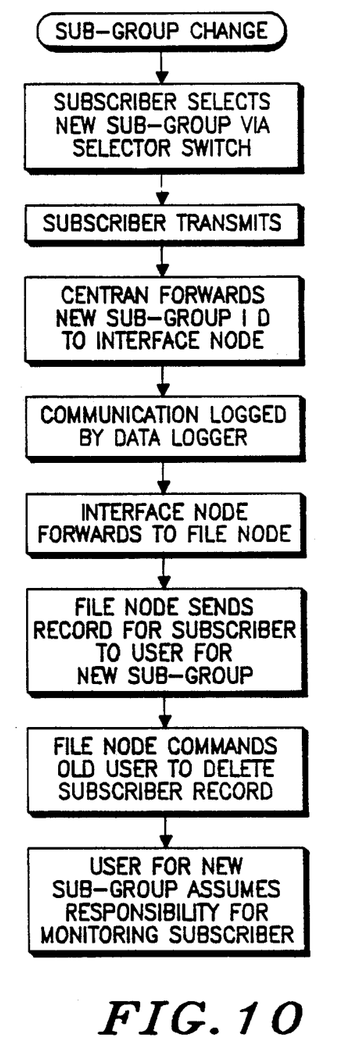
FIG. 10 is flow diagram of the steps executed to dynamically adapt the computer aided dispatch system of the present invention in response to a subscriber changing subgroups.

As previously mentioned, individual subscribers may change their subgroup affiliation either by a selector switch or under command of the dispatcher. Assuming that a subscriber has selected a different subgroup, the subgroup ID transmitted with the next transmission will be modified. That is, while the group ID and the individual ID will remain the same, the subscriber will transmit a different subgroup ID code. The trunked central controller receives the transmitted information together with the new ID code and forwards it to the interface and logger node 410, which passes the information to the master file node 402. By investigating the individual and subgroup ID table, the master file node may determine that the subscriber's subgroup affiliation has changed. Accordingly, the master file node transmits the corresponding updated data record to the user node(s) responsible for monitoring the selected subgroup. In this way, the subscriber is added to the subgroup of the responsible dispatcher. Also, the master file node instructs the previously attached user node(s) to delete this subscriber from the particular subgroup that formally identified the subscriber. A flow diagram illustrating these steps is provided in FIG. 10. As an example, consider that a subscriber in subgroup A changes his subgroup affiliation to subgroup B. Upon the next transmission, the master file node would forward updated data records to both user nodes 1 and 2. Dispatcher 1 (who monitors subgroups A and B) would observe the acronym identifying the subscriber moving from subgroup A to subgroup B (see FIG. 8). Additionally, dispatcher 2 (which monitors subgroups B and C) would observe the acronym identifying the subscriber appearing in the subgroup B affiliation. To illustrate a different aspect of the attachment data transfer method, consider that a subscriber in subgroup A changes his subgroup affiliation to subgroup C. In this case, the subscriber would disappear entirely from the display of dispatcher 1 and would appear in subgroup C of dispatcher 2, whom assumes full responsibility for monitoring the activities of that particular subscriber.

In addition to individual subscribers moving from dispatcher to dispatcher, attachment to entire subgroups may change either by assignment of the network manager, or by the request of a dispatcher. Each dispatcher may request attachment to additional subgroups, or that subgroups be deleted from his attachment file. Of course, when the dispatchers have the power to delete attachments, a possibility exists that a particular subgroup may not remain attached to any dispatcher. This, of course, is undesirable. Accordingly, the present invention contemplates that should this occur, the master file node will attach the subgroup to all logged on user node(s). If thereafter the network manager makes an assignment of this subgroup, the other user node(s) return to their original attachments, and the assigned dispatcher alone assumes responsibility for monitoring the subgroup.

Accordingly, there has been shown and described a computer aided dispatch system that dynamically and effectively allocates responsibility for monitoring data records based upon "attachment" to a value residing in at least one data field of any data record. The system of the present invention represents a departure from the centralized main frame approach in several ways. First, each user node comprises a self contained computer servicing the dispatcher's requests and providing updated information. Second, dispatcher commands (keystrokes) are not transmitted over the LAN, but rather, locally processed in the user node. Accordingly, the dispatchers enjoy a faster response time that would otherwise be available. Thirdly, each user node is generally self sufficient, and, except for initialization and data base record updates, need never communication over the LAN. This greatly reduces the complexity of the master file node, which comprises the hub of the network. These benefits, and other, are achieved by the present invention through the innovation of the "attachment" approach to file management, which automatically, and effectively allocates data records amongst available dispatchers.

While a particular embodiment of the present invention has been described and shown in the context of a trunked communication system, it will be understood by those of ordinary skill in the art that the present invention is not limited thereto since many modifications may be made. It is therefore contemplated that covered by the present application any and all such modifications that fall within the true spirit and scope of the basic underlying principles disclosed and claimed herein.

What is claimed is:

1. In a trunked communication system having at least one central controller for allocating a limited number of communication channels among a plurality of subscriber units each having an identification (ID) code stored therein and constructed and arranged to communicate information on any of said communication channels, a computer aided dispatch system comprising:
   a local area network;
   master node means coupled to said local area network for maintaining at least a plurality of records corresponding one each to the plurality of subscriber units, each of said records having a plurality of fields at least some of which represent at least a portion of said ID code of a subscriber unit;
   user node means coupled to said local area network for monitoring at least a predetermined subset of said plurality of subscriber units depending upon predetermined ID codes or a portion thereof;
   interface node means for interfacing said central controller to said local area network.

2. The system of claim 1, which includes a back-up node means coupled to said master node means for maintaining at least a copy of said plurality of records.

3. The system of claim 1, which includes a back-up interface node means responsive to said interface node means for providing an alternate interface between said central controller and said local area network.

4. The system of claim 3, which includes recording means responsive to said interface node means for recording communication transactions between said central controller and said interface means.

5. The system of claim 1, which includes recording means responsive to said interface node means for recording communication transactions between said central controller and said interface means.

6. In a trunked communication system having at least one central controller for allocating a limited number of communication channels among a plurality of subscriber units each having an identification (ID) code stored therein and constructed and arranged to communicate information on any of said communication channels, said trunked system also having a computer aided dispatch system comprising at least one master node for maintaining a plurality of records corresponding one each to said plurality of subscriber units, each of said records having a plurality of fields at least some of which represent at least a portion of said ID code of a subscriber unit, and a plurality of user node means for monitoring at least a predetermined subset of said plurality of subscriber units depending upon predetermined ID codes or a portion thereof, a method of managing said records comprising the steps of:
   at a user node:
   (a) transmitting at least one record change to said master node;
   (b) forming at least one modified record based at least in part on said at least one record change;
   (c) distributing copies of said at least one modified record among said several user nodes based at least in part on said at least one predetermined value;
   at each of said several user nodes receiving at least one of said copies;
   (d) forming at least one modified record based at least in part on said at least one of said copies.

7. The method of claim 6 which includes the step of:
   (a') requesting any records having a predetermined value, said requesting step (a') at a user node prior to said user node transmitting step (a).

8. The method of claim 7 which includes the step of:
   (b') transmitting a copy of any records having a predetermined value to said user node, said transmitting step (b') at a master node prior to said master node forming step (b).

* * * * *

UNITED STATES PATENT AND TRADEMARK OFFICE
CERTIFICATE OF CORRECTION

PATENT NO. : 4,926,495

DATED : 05/15/90

INVENTOR(S) : Richard A. Comroe et al.

It is certified that error appears in the above-identified patent and that said Letters Patent is hereby corrected as shown below:

At column 10, line 44, insert before "(b)" --at a master node--.

At column 10, line 58, "of any records" should be --of said any records--.

Signed and Sealed this

Fourteenth Day of July, 1992

Attest:

DOUGLAS B. COMER

*Attesting Officer*    *Acting Commissioner of Patents and Trademarks*